(12) United States Patent
Seto

(10) Patent No.: US 11,544,875 B2
(45) Date of Patent: Jan. 3, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takamasa Seto, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/024,378

(22) Filed: Sep. 17, 2020

(65) Prior Publication Data
US 2021/0004988 A1 Jan. 7, 2021

Related U.S. Application Data

(63) Continuation of application No. PCT/JP2019/010440, filed on Mar. 14, 2019.

(30) Foreign Application Priority Data

Mar. 30, 2018 (JP) .............................. JP2018-066925

(51) Int. Cl.
G06T 7/73 (2017.01)
G06T 7/90 (2017.01)
G06T 5/00 (2006.01)
G06T 7/00 (2017.01)

(52) U.S. Cl.
CPC ............... *G06T 7/90* (2017.01); *G06T 5/006* (2013.01); *G06T 7/001* (2013.01); *G06T 7/73* (2017.01);
(Continued)

(58) Field of Classification Search
CPC ........... G06T 5/006; G06T 7/001; G06T 7/74; G06T 7/73; G06T 7/90
See application file for complete search history.

(56) References Cited

U.S. PATENT DOCUMENTS 6,661,931 B1 12/2003 Kawada ................. G01B 11/00
8,531,729 B2 9/2013 Seto ............................ 358/3.23
(Continued)

FOREIGN PATENT DOCUMENTS

JP 2001-160135 6/2001
JP 2004-125434 4/2004
(Continued)

OTHER PUBLICATIONS

International Search Report and Written Opinion in parent PCT/JP2019/010440.
(Continued)

Primary Examiner — Sam Bhattacharya
(74) Attorney, Agent, or Firm — Venable LLP

(57) ABSTRACT

The present invention provides an image processing apparatus for evaluating a surface of an object using a marker including marks whose positional relationship in a case where the marker is arranged in plane is known, the maker being arranged on the surface of the object. The image processing apparatus includes: a first acquisition unit configured to obtain image data obtained by capturing an image of the surface and an image of the marker arranged on the surface; a second acquisition unit configured to obtain information indicating positional relationship among the marks included in the marker; an extraction unit configured to extract the positional relationship among the marks included in the marker in an image indicated by the image data; and a correction unit configured to correct the image data based on the positional relationship indicated by the information and the extracted positional relationship.

17 Claims, 10 Drawing Sheets

(52) U.S. Cl.
CPC .............. *G06T 2207/30156* (2013.01); *G06T 2207/30168* (2013.01); *G06T 2207/30204* (2013.01); *G06T 2207/30248* (2013.01)

(56) References Cited

U.S. PATENT DOCUMENTS

| | | | |
|---|---|---|---|
| 8,630,021 B2 | 1/2014 | Seto | 358/1.9 |
| 2014/0022568 A1 | 1/2014 | Nakaya | B65C 9/40 |
| 2015/0317786 A1 | 11/2015 | Huang et al. | G06T 7/0006 |
| 2015/0339817 A1 | 11/2015 | Kuriyama | G06T 7/00 |
| 2017/0270683 A1 | 9/2017 | Sakamoto et al. | G06T 7/60 |
| 2021/0004987 A1 | 1/2021 | Matsuura et al. | G06T 7/90 |

FOREIGN PATENT DOCUMENTS

| | | |
|---|---|---|
| JP | 2004-150908 | 5/2004 |
| JP | 2007-040839 | 2/2007 |
| JP | 2007-248072 | 9/2007 |
| JP | 2008-151740 | 7/2008 |
| JP | 2013-232115 | 11/2013 |
| JP | 2014-019090 | 2/2014 |
| JP | 2014-035261 | 2/2014 |
| JP | 2015-043836 | 3/2015 |
| JP | 2015-161809 | 9/2015 |
| JP | 2016-164559 | 9/2016 |
| JP | 2017-167817 | 9/2017 |
| WO | 2014/119047 | 8/2014 |

OTHER PUBLICATIONS

Office Action dated Oct. 11, 2022 in counterpart Japanese Application No. 2018-066925, together with English translation thereof.

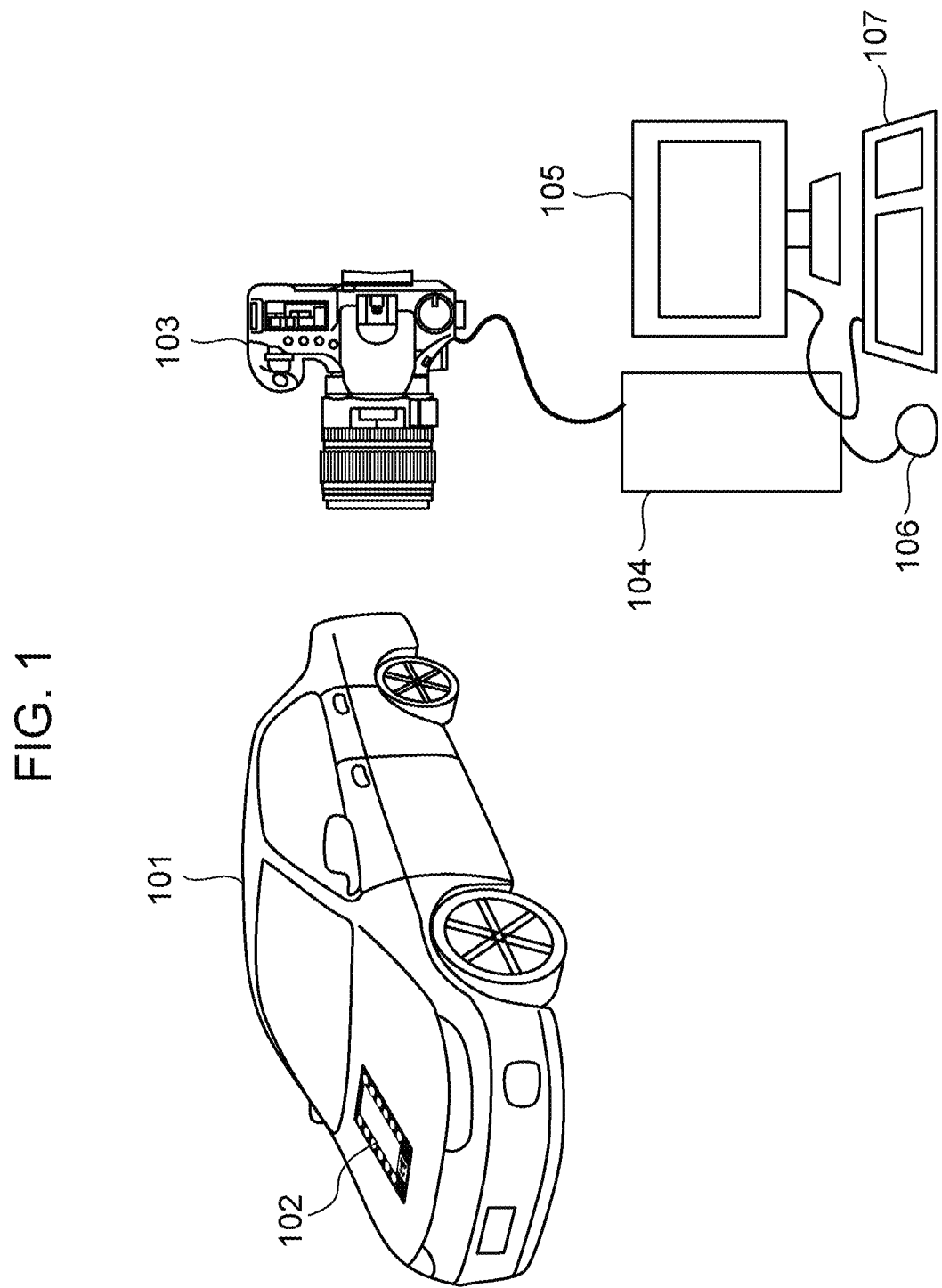

IMAGE PROCESSING APPARATUS, IMAGE PROCESSING METHOD, AND STORAGE MEDIUM

CROSS-REFERENCE TO RELATED APPLICATIONS

This application is a Continuation of International Patent Application No. PCT/JP2019/010440, filed Mar. 14, 2019, which claims the benefit of Japanese Patent Application No. 2018-066925, filed Mar. 30, 2018, both of which are hereby incorporated by reference herein in their entirety.

BACKGROUND OF THE INVENTION

Field of the Invention

The present invention relates to an image processing technique for evaluating the color of an object.

Background Art

There is known a technique for evaluating the color of an object to be imaged using a captured image obtained from a digital camera. PTL 1 discloses a technique for examining the difference in color texture by comparing the chromaticity distribution of the test object obtained by image capturing with the chromaticity distribution of a reference object.

In a case where an object is imaged and the color of the object is evaluated, the color obtained by image capturing will differ depending on the shape of the object and the image capturing conditions. However, the known technique as disclosed in PTL 1 has a problem in that the evaluation of the color changes when at least one of the shape of the object and the image capturing conditions changes.

The present invention is made in view of the above problem, and an object is to provide information for evaluating the color of the object independent of the shape of the object and the image capturing conditions.

CITATION LIST

Patent Literature

PTL 1: Japanese Patent Laid-Open No.2016-164559

SUMMARY OF THE INVENTION

According to the first aspect of the present invention, there is provided an image processing apparatus for evaluating a surface of an object using a marker including a plurality of marks whose positional relationship in a case where the marker is arranged in plane is known, the maker being arranged on the surface of the object, the image processing apparatus comprising:
a first acquisition unit configured to obtain image data obtained by capturing an image of the surface of the object and an image of the marker arranged on the surface of the object;
a second acquisition unit configured to obtain information indicating positional relationship among the plurality of marks included in the marker;
an extraction unit configured to extract the positional relationship among the plurality of marks included in the marker in an image indicated by the image data; and
a correction unit configured to correct the image data based on the positional relationship indicated by the information and the extracted positional relationship.

According to the second aspect of the present invention, there is provided an image processing method for evaluating a surface of an object using a marker including a plurality of marks whose positional relationship in a case where the marker is arranged in plane is known, the maker being arranged on the surface of the object, the image processing method comprising:
obtaining image data obtained by capturing an image of the surface of the object and an image of the marker arranged on the surface of the object;
obtaining information indicating positional relationship among the plurality of marks included in the marker;
extracting the positional relationship among the plurality of marks included in the marker in an image indicated by the image data; and
correcting the image data based on the positional relationship indicated by the information and the extracted positional relationship.

According to the third aspect of the present invention, there is provided a non-transitory computer-readable storage medium storing a program for causing a computer to perform an image processing method for evaluating a surface of an object using a marker including a plurality of marks whose positional relationship in a case where the marker is arranged in plane is known, the maker being arranged on the surface of the object, the image processing method comprising:
obtaining image data obtained by capturing an image of the surface of the object and an image of the marker arranged on the surface of the object;
obtaining information indicating positional relationship among the plurality of marks included in the marker;
extracting the positional relationship among the plurality of marks included in the marker in an image indicated by the image data; and
correcting the image data based on the positional relationship indicated by the information and the extracted positional relationship.

Further features of the present invention will become apparent from the following description of exemplary embodiments with reference to the attached drawings.

BRIEF DESCRIPTION OF THE DRAWINGS

FIG. 1 is a diagram illustrating the configuration of an image processing system.

DESCRIPTION OF THE EMBODIMENTS

Figure 2A:
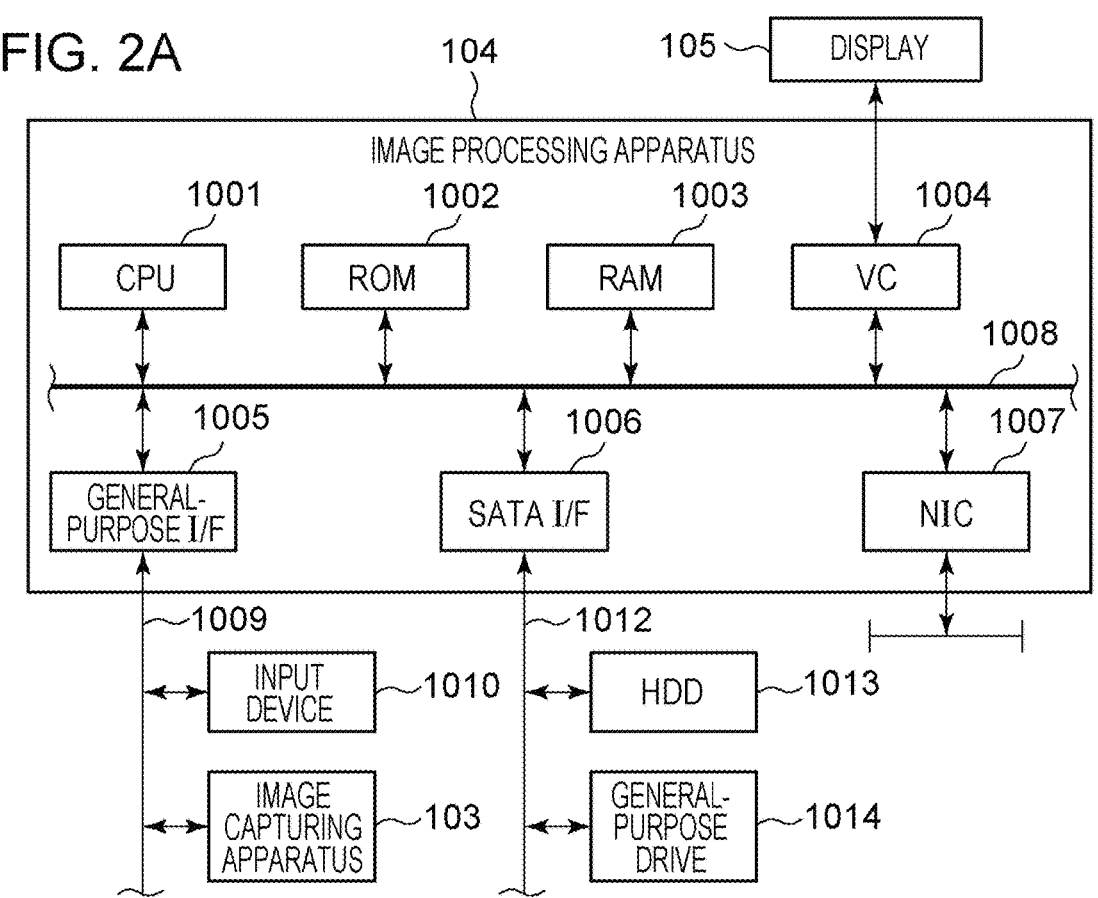
FIG. 2A is a block diagram illustrating the hardware configuration of an image processing apparatus.

Embodiments of the present invention will be described hereinbelow with reference to the drawings. The following embodiments do not necessarily limit the present invention. Not all combinations of the features described in the present embodiments are essential for the solution of the present invention.

First Embodiment

In the present embodiment, the color of an object independent of the shape of the object and the image capturing conditions (the direction and distance of image capturing) is evaluated. The object (a three-dimensional object) in the present embodiment is a vehicle body having a curved shape.

(Configuration of Image Processing System)

FIG. 1 is a diagram illustrating the configuration of an image processing system according to the present embodiment. The image processing system includes an image capturing unit 103 and an image processing apparatus 104. An object 101 is the object to be imaged, and in the present embodiment, the color of the object 101 is the object to be evaluated. The marker 102 is a marker affixed to the surface of the object 101 to evaluate the color. The marker 102 has a feature indicating the shape of the object 101 by being affixed to the surface of the object 101. The image capturing unit 103 is a digital camera for capturing an image of the object 101 so that the marker 102 affixed to the surface of the object 101 is included in the image capturing range. Although the object 101 in the present embodiment is the exterior or the interior of a vehicle body that differs in shape among parts, any object having a curved shape may be employed as the object 101. The image capturing unit 103 includes a lens and an area sensor with 4,000×2,000 pixels, such as a complementary metal-oxide semiconductor (CMOS), and generates image data indicating an image having 24-bit color information, 8 bits for each of red (R), green (G), and blue (B) pixels. The image capturing unit 103 may be any camera that can obtain a two-dimensional distribution of the color information of the object to be imaged, and the number of colors, the bit depth, the number of pixels, and so on are not limited to the above example. The image capturing unit 103 is connected to the image processing apparatus 104 via an interface, such as a universal serial bus (USB). The image processing apparatus 104 is a general-purpose computer, such as a personal computer. The image processing apparatus 104 is connected to a display 105, a mouse 106, and a keyboard 107 via an interface, such as a high-definition multimedia interface (HDMI®) or a USB.

(Marker 102)

Figure 4:
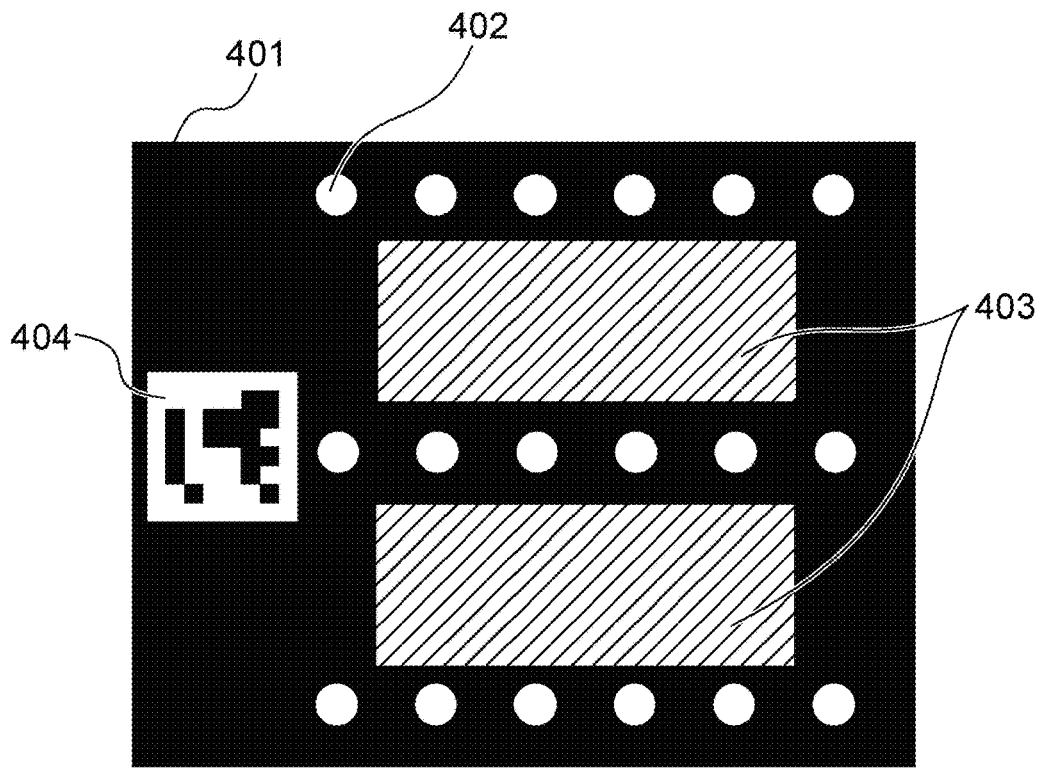
FIG. 4 is a diagram illustrating an example of a marker.

Next, the marker 102 will be described in detail. FIG. 4 is a diagram illustrating an example of the layout of the marker 102. A frame area 401 is a black area, on which various patterns are arranged. Mark areas 402 are while circular areas for use in geometric correction of the captured image. The marker 102 has an area including a pattern formed of a plurality of marks areas 402 arranged at predetermined intervals. At least four mark areas 402 are arranged on the frame area 401. In FIG. 4, a total of 18 mark areas 402, six in the horizontal direction and three in the vertical direction, are provided. If blurring has occurred in the edges of the mark areas 402 in the captured image due to the influence of the depth of field or the like, the circular shape of the mark areas 402 allows stable calculation of the central coordinates of each circular area independent of a threshold for binarization or another parameter. In the case where it is desirable to capture images from various directions, such as for a curved object, the images are particularly susceptible blurring. Accordingly, the shape of the mark areas 402 is preferably circular.

The hatched areas in FIG. 4 are evaluation areas 403. The evaluation areas 403 are cut-out areas of the marker 102. For this reason, in a case where the marker 102 is affixed to the object 101, the surface of the object 101 is exposed, allowing evaluation of the color of the surface of the object 101. Performing geometric correction of the captured image obtained by capturing the image of the evaluation areas 403 by using the disposition of the evaluation areas 403 surrounded by the mark areas 402 allows evaluation of the color independent of the shape of the object 101 and the image capturing conditions.

An identification (ID) code area 404 is an area in which identification information is coded. The identification information is information for use in identifying the marker 102 and is a number assigned for each manufactured marker 102. This identification number allows distinguishing the evaluation areas 403 to evaluate the color even if a plurality of markers 102 are included in one captured image. The ID code area 404 uses a pattern in which the area is divided into 64 blocks in total with 8×8 pixels, and the individual blocks are expressed in binary values of black and white so that a 64-bit identification number can be expressed.

The color of the mark areas 402 is preferably white to estimate the difference in the intensity of the illumination light among the mark areas 402. By estimating the difference in illumination light among the mark areas 402, the influence of unevenness in illuminance generated in the evaluation areas 403 can be reduced. Since the object 101 of the present embodiment has a curved surface, the intensity of illumination light is more likely to change than with a flat surface depending on the position. For this reason, reducing the influence of illumination unevenness allows high-accuracy evaluation of the color of the evaluation areas 403. The color of the frame area 401 is preferably black to perform processing for extracting the mark areas 402 from the captured image by increasing the contrast to the mark areas 402.

The marker 102 is obtained by printing the above layout on a flexible substrate that can be freely bent according to the surface of the object 101. The substrate is preferably made of a material that can be repeatedly bonded and peeled, such as a magnet or an absorption sheet. The marker 102 is preferably affixed so that no creases are generated on the marker 102 or no gap is generated between the marker 102 and the object 101. Using a mat printing medium having a diffusion property, such as ink or toner for printing, reduces reflection of a light source and surroundings, allowing high-accuracy extraction of the mark areas 402.

(Hardware Configuration of Image Processing Apparatus 104)

FIG. 2A is a block diagram illustrating the hardware configuration of the image processing apparatus 104. The image processing apparatus 104 includes a central processing unit (CPU) 1001, a read-only memory (ROM) 1002, and a random-access memory (RAM) 1003. The image processing apparatus 104 further includes a video card (VC) 1004, a general-purpose interface (I/F) 1005, a serial advanced technology attachment (ATA) (SATA) I/F 1006, and a network interface card (NIC) 1007. The CPU 1001 executes an operating system (OS) and various programs stored in the ROM 1002, a hard disk drive HDD (1013), or the like, using the RAM 1003 as a work memory. The CPU 1001 controls the various components via a system bus 1008. Processing of the flowcharts described later is executed by the CPU 1001 after program codes stored in the ROM 1002 or the HDD 1013 are expanded in the RAM 1003. The VC 1004 is connected to the display 105. The general purpose I/F 1005 is connected to an input device 1010, such as the mouse 106 and the keyboard 107, and the image capturing unit 103 via a serial bus 1009. The SATA I/F 1006 is connected to the HDD 1013 and a general-purpose drive 1014 for reading and writing various recording media via a serial bus 1012. The NIC 1007 is used to input and output information to and from an external device. The CPU 1001 uses the HDD 1013 and various recording media mounted to the general-purpose drive 1014 as storage for various items of data. The CPU 1001 displays a user interface (UI) provided by a program on the display 105 to receive an input, such as a user's instruction, received via the input device 1010.

(Functional Configuration of Image Processing Apparatus 104)

Figure 2B:
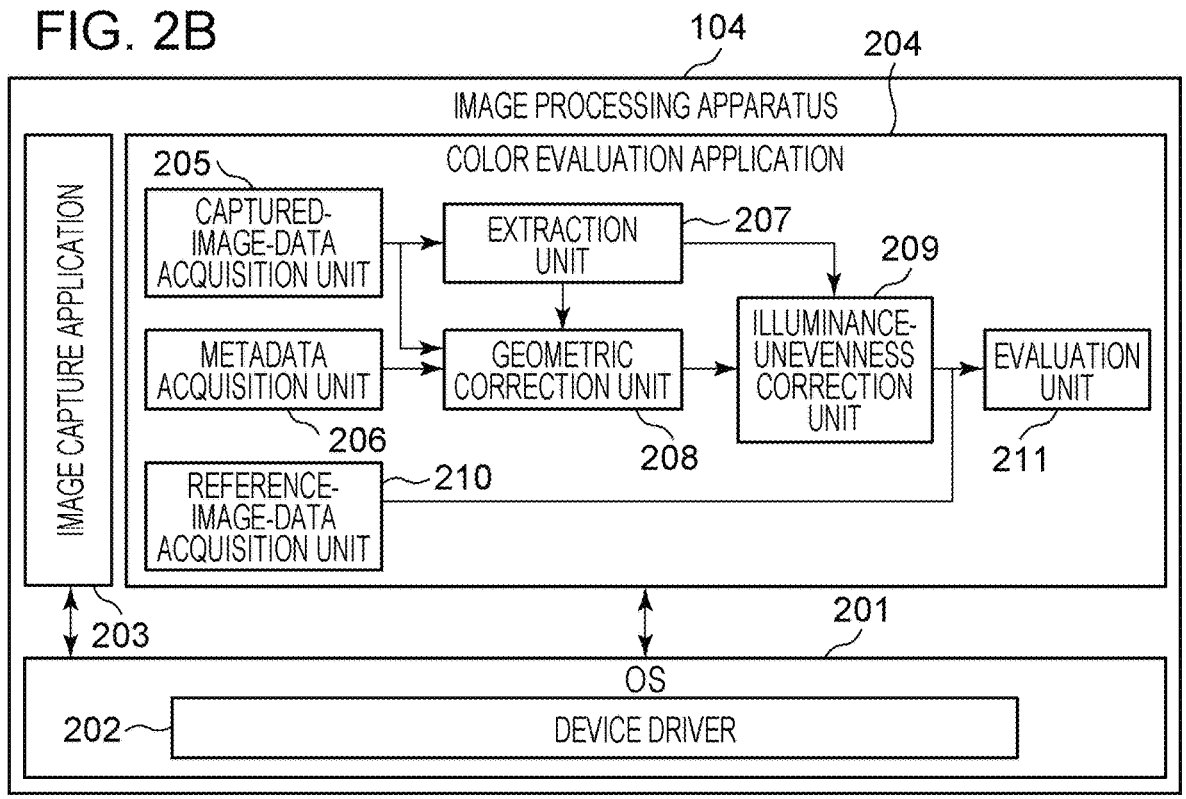
FIG. 2B is a block diagram illustrating the configuration of the image processing apparatus.

FIG. 2B is a block diagram illustrating the functional configuration of the image processing apparatus 104. An OS 201 is an operating system which is a set of commands for controlling input and output, starting and changing applications, and so on. A device driver 202 is a device driver included in the OS 201 and is a set of commands for controlling the devices, such as the image capturing unit 103, the display 105, the mouse 106, and the keyboard 107, connected to the image processing apparatus 104. Various applications can control these devices by issuing predetermined instructions to the OS 201.

An image capture application 203 is a set of commands for implementing a series of operations for storing image data obtained by image capturing using the image capturing unit 103 in the HDD 1013. Specifically, the image capture application 203 issues commands to change the International Organization for Standardization (ISO) sensitivity, shutter speed, f/number, and so on of the image capturing unit 103, a command to execute image capturing, a command to transfer image data, and other commands based on a user's instruction input via the mouse 106 or the keyboard 107 to the OS 201. The results are displayed on the display 105.

A color evaluation application 204 is a set of commands for processing captured image data obtained by capturing an image of the marker 102 affixed to the surface of the object 101 to evaluate the color of the object 101. The color evaluation application 204 includes a captured-image-data acquisition unit 205, a metadata acquisition unit 206, an extraction unit 207, a geometric correction unit 208, an illuminance-unevenness correction unit 209, a reference-image-data acquisition unit 210, and an evaluation unit 211. The captured-image-data acquisition unit 205 obtains captured image data obtained by capturing an image of the marker 102 affixed to the surface of the object 101. The metadata acquisition unit 206 obtains metadata for use in normalizing the captured image that the captured image data indicates. Here the metadata is metadata indicating the details of the marker image (normal image). Geometric correction for matching the pixel coordinates of the captured image with the pixel coordinates of the normal image is referred to as normalization. The extraction unit 207 extracts the ID code area 404 of the marker 102 in the captured image and reads the identification number of the marker 102. The geometric correction unit 208 normalizes the captured image based on the metadata. The illuminance-unevenness correction unit 209 corrects the normalized captured image to reduce illuminance unevenness included in the normalized captured image. The reference-image-data acquisition unit 210 obtains reference image data indicating a reference image to be compared with the normalized captured image. The evaluation unit 211 evaluates the color of the object 101 based on the captured image data indicating the normalized captured image and the reference image data.

(Processing Executed by Image Processing System)

Figure 3:
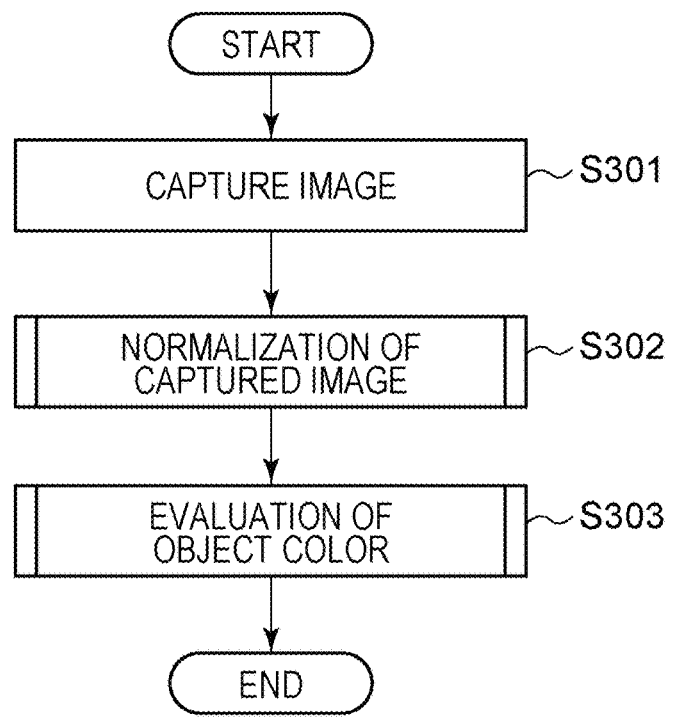
FIG. 3 is a flowchart illustrating processing executed by the image processing apparatus.

Processing executed by the image processing system of the present embodiment will be described with reference to the flowchart of FIG. 3. The individual steps (processes) are represented by adding S before the signs.

In S301, the image capture application 203 captures an image of an area of the object 101 to which the marker 102 is affixed using the image capturing unit 103. The captured image data obtained by image capturing is sent to the HDD 1013 for storage. In S302, the color evaluation application 204 processes the stored captured image data to generate captured image data indicating a normalized captured image. The details of the processing of S302 will be described later. In S303, the color evaluation application 204 evaluates the color of the object 101 based on the captured image data indicating the normalized captured image and displays the result of evaluation on the display 105. The details of the processing of S303 will be described later.

(Processing in S302)

Figure 5:
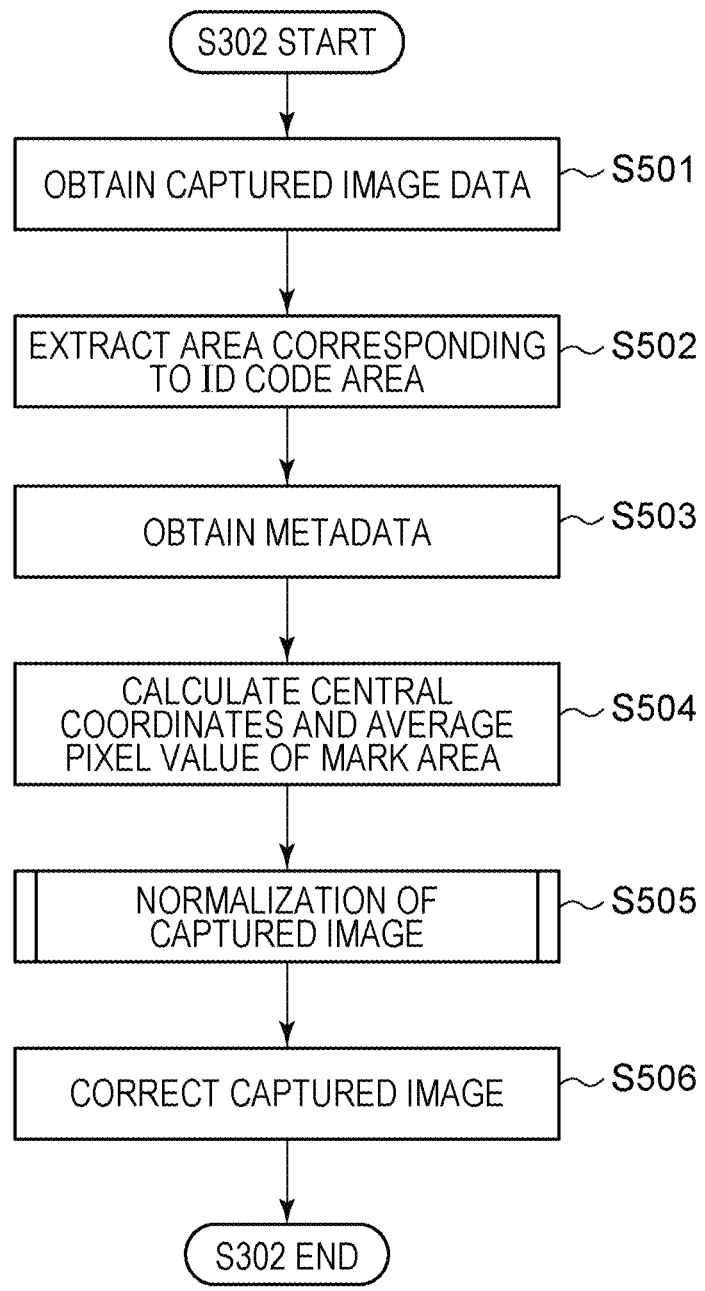
FIG. 5 is a flowchart illustrating processing for obtaining a normalized captured image.

The details of the processing executed by the color evaluation application 204 in S302 will be described hereinbelow. FIG. 5 is a flowchart illustrating the procedure of the processing executed by the color evaluation application 204 in S302. When the color evaluation application 204 receives a startup instruction from the OS 201, the processing of S501 is executed.

In S501, the captured-image-data acquisition unit 205 obtains the captured image data obtained by image capturing in S302. Specifically, a file dialog or the like is displayed on the display 105, and the captured image data is read from the HDD 1013 into a main storage, such as the RAM 1003, according to a user's instruction via the input device 1010.

In S502, the extraction unit 207 extracts an area corresponding to the ID code area 404 from the captured image and reads the identification number of the marker 102 from the pattern of the extracted area. Specifically, the extraction unit 207 binarizes the pixel values of the captured image. This binarization processing converts pixels having pixel values equal to or greater than a predetermined threshold to white, and pixels having pixel values less than the predetermined threshold to black. The extraction unit 207 extracts the edge position from the binarized captured image using the known Canny method, and performs contour extraction that regards pixels that have edge positions in eight neighboring pixels as the same contour and groups them. A quadrangular contour is selected from the extracted plurality of contour groups and deforms the contour so that the ID code area 404 has the same shape as the actual shape. The pattern in the deformed contour is divided into 8×8 pixel blocks, and the identification number is read based on the shade of each block.

Figure 6:
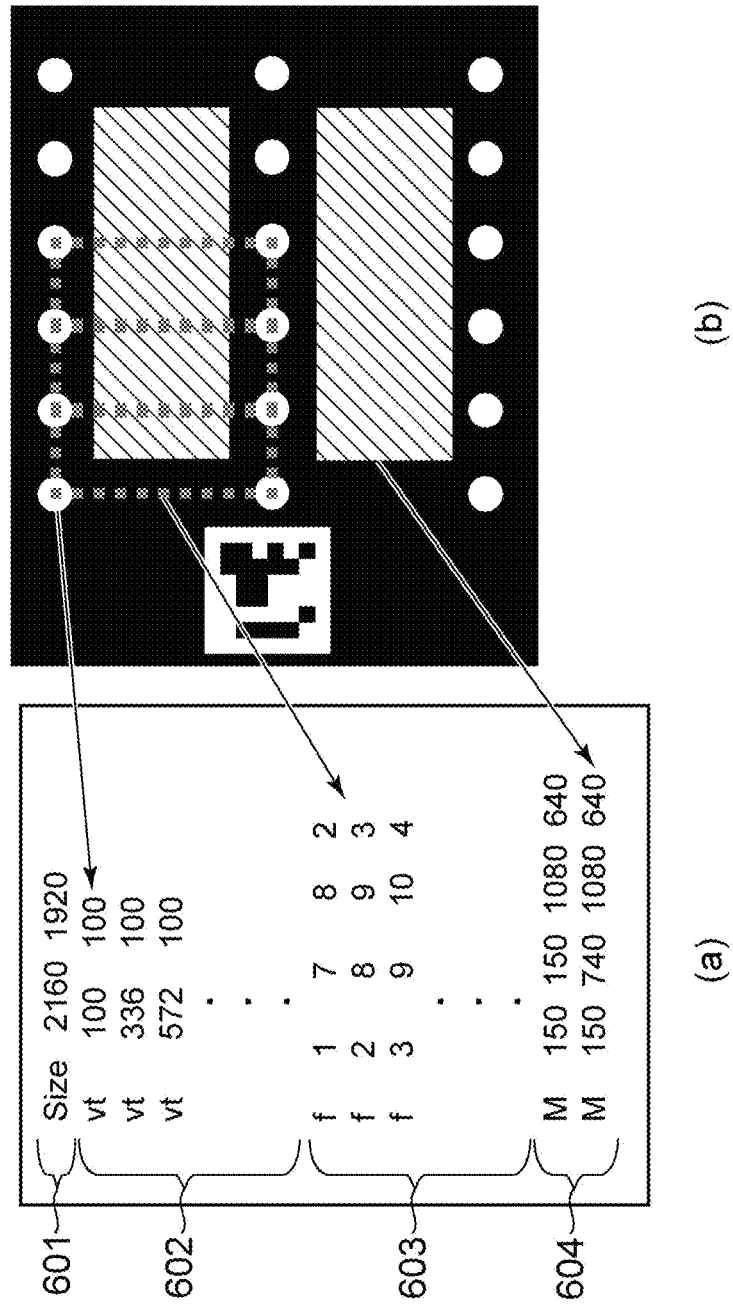
FIG. 6 is a diagram illustrating an example of metadata.

In S503, the metadata acquisition unit 206 reads metadata for use in normalizing the captured image from the HDD 1013 into a main storage, such as the RAM 1003. The metadata will be described with reference to FIG. 6.

FIG. 6(a) is a diagram illustrating an example of the metadata. Area 601 is an area in which the size of the normalized captured image is recorded, in which the width and the height are recorded in pixel units. Area 602 is an area in which the central coordinate value of each of the mark areas 402 in the normalized captured image is shown, in which two-dimensional coordinate values with the origin at the upper left of the normalized captured image is recorded in each row in pixel units. Accordingly, the same number of rows as the number of the mark areas 402 are recorded in the area 602. Area 603 is an area in which information on the rectangles indicated by the broken lines in FIG. 6(b) is recorded. Row numbers in area 602 each corresponding to the four vertexes of the rectangle with a vertex at the center of each mark area 402 recorded in area 602 are recorded in the rows in area 603. Area 604 is an area in which the position and the size of each of the evaluation areas 403 in the normalized captured image are recorded. The coordinate values at the upper left of each evaluation area 403, and the width and height in the normalized captured image are recorded in each row in pixel units. This metadata is stored in advance in the HDD 1013 in text format.

In S504, the extraction unit 207 calculates the central coordinates of each mark area 402 based on the captured image data as information for specifying the distortion of the marker 102 in the captured image. The extraction unit 207 also calculates the average pixel value of each of the mark areas 402 as white information. Here, the extraction unit 207 performs processing up to the contour extraction as in S502 to select candidates of a circular or elliptical contour from the contour group. The area enclosed by each of the circular or elliptical contours selected as a contour candidate is calculated, and the candidates are placed in order according to the difference between the area of each contour calculated and the area of each mark area 402 preset. A plurality of contours corresponding to mark areas 402 of rank 1 to 18 are extracted, and the central coordinate values of each contour and the average pixel value of the contour are calculated. The central coordinate values and the average pixel value of each contour are sorted so that the relative positional relationship of the central coordinate values of the contours match the relative positional relationship of the coordinate values described in area 602.

Figure 7:
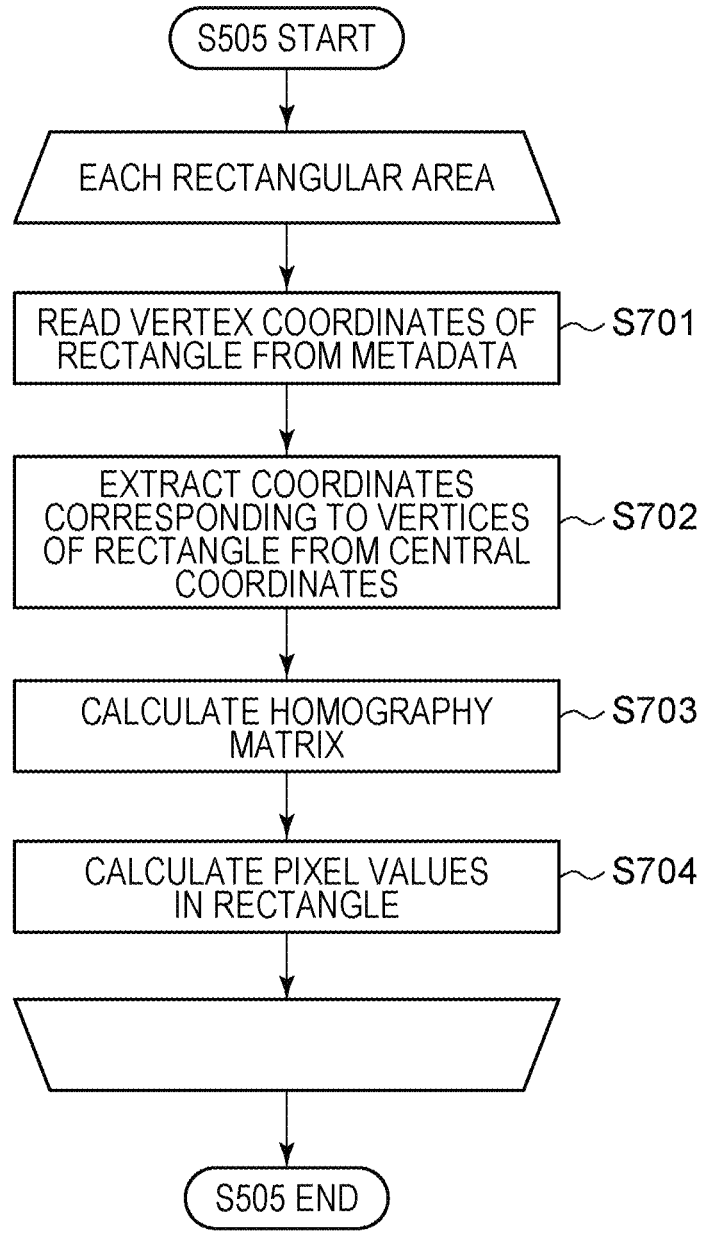
FIG. 7 is a flowchart illustrating processing for calculating color information on the normalized captured image.

In S505, the geometric correction unit 208 normalizes the captured image obtained by capturing an image of the marker 102 affixed to the surface of the object 101 based on the metadata to obtain captured image data indicating a normalized captured image. The details of the processing of S505 will be described with reference to the flowchart of FIG. 7.

In S701, the geometric correction unit 208 reads the vertex coordinates of the rectangle from the metadata. Specifically, the geometric correction unit 208 reads, from the metadata, one row from the rectangle information shown in area 603 and reads coordinate values corresponding to each vertex from the area 602. In S702, the geometric correction unit 208 reads coordinate values corresponding to each vertex whose coordinate values are read in S701 from the central coordinates of the mark areas 402 calculated in S504. The order of the central coordinates of the mark areas 402 are sorted in S504 so as to match the order of the coordinate values registered in area 602. For this reason, in S702, the central coordinates corresponding to the vertex numbers described in area 603 are extracted as in S701.

In S703, the geometric correction unit 208 calculates a homography matrix in which a plane formed of the coordinate values of the vertexes read in S701 is projected to a plane formed of the coordinate values of the vertexes read in S702. Here the homography matrix is a matrix expressed by Eq. (1) having a to h as elements, where (u', v') is the coordinate values of a non-normalized captured image, and (u, v) is the coordinate values of a normalized captured image, where u' is the pixel position (coordinate) of the non-normalized captured image in the horizontal direction, v' is the pixel position (coordinate) of the non-normalized captured image in the vertical direction, u is the pixel position (coordinate) of the normalized captured image in the horizontal direction, and v is the pixel position (coordinate) of the normalized captured image in the vertical direction.

[Math. 1]

$$\begin{bmatrix} u' \\ v' \\ 1 \end{bmatrix} = \begin{bmatrix} a & b & c \\ d & e & f \\ g & h & 1 \end{bmatrix} \begin{bmatrix} u \\ v \\ 1 \end{bmatrix} \quad \text{Eq. (1)}$$

The homography matrix expressed by Eq. (1) is calculated by solving simultaneous linear equations based on the correspondence relationship of the coordinates of the four vertexes of the rectangle because the degree of freedom is 8.

In S704, the geometric correction unit 208 calculates the color information on the individual pixels of the normalized captured image based on the captured image before being normalized. First, the geometric correction unit 208 reserves, in the RAM 1003, a storage area in which captured image data indicating the normalized captured image is to be stored. In other words, the geometric correction unit 208 reserves a storage area, in the RAM 1003, for storing image data indicating an image which has the width and the height recorded in area 601 and whose pixels have 24-bit color information of 8 bits for each color of RGB, which is the same as the captured image before being normalized. In a case where this processing is repeatedly performed on the plurality of rectangles, this storage area is reserved only at the first processing. Next, the geometric correction unit 208 converts the coordinate values (u, v) of each pixel in the target rectangle in the normalized captured image according to Eq. (1) to calculate the coordinate values (u', v') in the captured image. The geometric correction unit 208 calculates color information on the coordinate values (u', v') in the captured image from color information on the peripheral pixels by known linear interpolation, bicubic interpolation, or the like, and uses the color information as color information on the coordinate values (u, v) of the normalized captured image. The processing from S701 to S704 is performed on all of the rectangles defined in the individual rows of area 603, and thus captured image data indicating a normalized captured image is obtained.

In S506, the illuminance-unevenness correction unit 209 corrects the normalized captured image to reduce the illuminance unevenness of the evaluation areas in the normalized captured image. In the present embodiment, the mark areas 402 are used as the white areas. First, the illuminance-unevenness correction unit 209 reserves a storage area of the same size as that of the normalized captured image in the RAM and generates illuminance unevenness image data. Next, the illuminance-unevenness correction unit 209 calculates the color information on pixels positioned at the vertex coordinates of each rectangle, with the average pixel value of the mark area 402 corresponding to the vertices calculated in S504 as white information. Next, the illuminance-unevenness correction unit 209 calculates pixel values in each rectangle by weighted averaging of adding weight according to the distance between the vertex positions of each rectangle and the pixels in each rectangle. Next, the illuminance-unevenness correction unit 209 corrects the normalized captured image based on the illuminance unevenness image data. The illuminance-unevenness correction unit 209 calculates the average value of the color information on the illuminance unevenness image for each evaluation area and calculates a coefficient (the average value of color information/color information on the target pixel) for each pixel. The correction is performed by multiplying the color information on each pixel of the evaluation area in the normalized captured image by a coefficient for the pixel. The corrected captured image is displayed on the display 105. The corrected captured image may not be displayed on the display 105, but captured image data indicating the corrected captured image may be stored in any area in the HDD 1013 designated by the user.

(Processing in S303)

Figure 8:
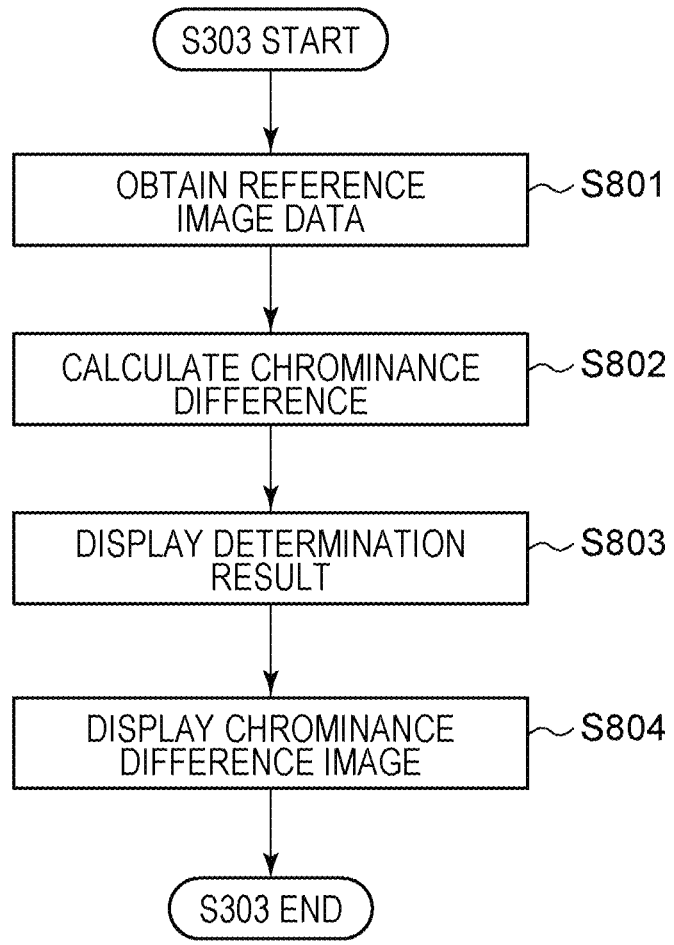
FIG. 8 is a flowchart illustrating processing for color evaluation.

The details of the processing executed by the color evaluation application 204 in S303 will be described hereinbelow. FIG. 8 is a flowchart illustrating the procedure of the processing executed by the color evaluation application 204 in S303.

In S801, the reference-image-data acquisition unit 210 obtains reference image data indicating a reference image to be compared with the captured image. The reference image is an image obtained by normalizing image data, by the processing in S303, obtained by capturing an image of the marker 102 affixed to another object different from the object 101 or the marker 102 affixed to a different position of the object 101. In S801, the reference-image-data acquisition unit 210 reads reference image data that is stored in any position in the HDD 1013 in advance.

In S802, the evaluation unit 211 calculates the color difference between the color information on each pixel of all the pixels of the evaluation areas 403 in the normalized captured image and the color information on a pixel at the same position of the reference image. The color difference is the mean square error of each of RGB channels. The color difference may be the mean square error of color information obtained by converting RGB to color information in an isochromatic space, such as CIEL*a*b* color space, using a conversion formula.

In S803, the evaluation unit 211 calculates the average value of the color difference of the pixels calculated in S802 as an evaluated value. The calculated evaluated value is compared with a predetermined value, and if the evaluated value is equal to or less than the predetermined value, it is determined that the captured image and the reference image has the same color, and a dialog or the like indicating the determination result that they have the same color is displayed on the display 105. If the evaluated value is greater than the predetermined value, a dialog or the like indicating that they do not have the same color is displayed on the display 105.

Figure 11A:
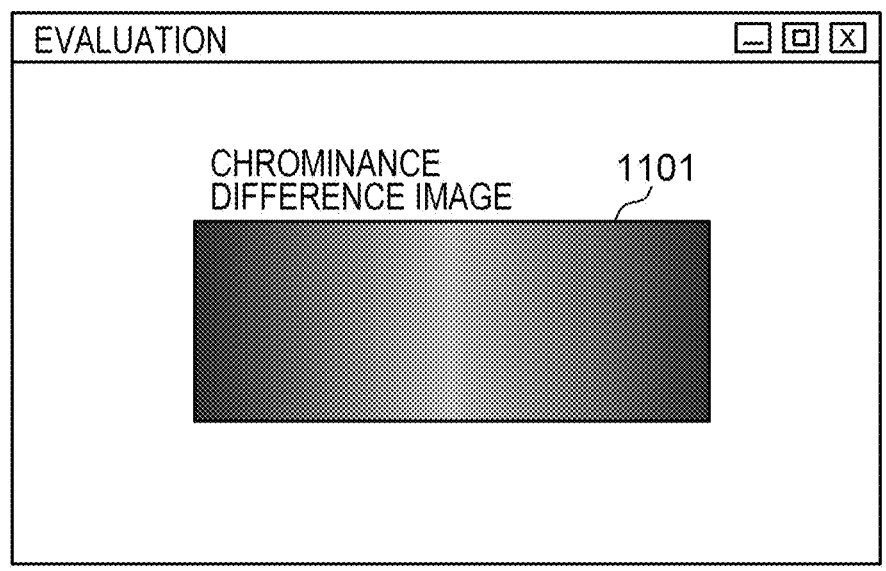
FIG. 11A is a diagram illustrating an example of an image displayed on a display.

In S804, the evaluation unit 211 generates color difference image data and displays a color difference image indicated by the generated color difference image data on the display 105. The color difference image is an image in which the color difference among the pixels is expressed as 8-bit shade. FIG. 11A illustrates an example of the color difference image displayed on the display 105. In the example of FIG. 11A, an area 1101 corresponding to the evaluation area 403 in the color difference image is clipped and displayed. Displaying the color difference image enables the user to visually check, for example, whether there is a scratch on the object 101. The size of the scratch in the captured image differs depending on the image capturing direction or the image capturing distance. However, normalizing the captured image by the above processing allows evaluation of color independent of the shape of the object 101 and the image capturing conditions. This can increase the efficiency of examination of an object. Either of S803 and S804 may be performed. For example, in examination of the object 101, in S803, a determination result that the captured image and the reference image have the same color may be reported to the user as acceptance, and a determination result that they have not the same color may be reported to the user as non-acceptance.

Effects of First Embodiment

As described above, the image processing apparatus of the present embodiment is an image processing apparatus for evaluating the surface of an object having a marker including a plurality of marks whose positional relationship in a case where the marker is arranged in plane is known, using the marker. The image processing apparatus obtains image data obtained by capturing an image of the surface of the object and the marker arranged on the surface of the object. The image processing apparatus obtains information indicating the positional relationship among the plurality of marks included in the marker. The image processing apparatus extracts the positional relationship among the plurality of marks including in the marker in the image indicated by the image data. The image processing apparatus corrects the image data based on the positional relationship indicated by the information and the extracted positional relationship. This facilitates examination of, between different parts of the object, or between parts and paint samples, whether there is a difference in color between parts with different shapes and whether there is a scratch. For the exterior of a vehicle body, like the object 101 of the present embodiment, coating uniformity can be evaluated. In other words, the present embodiment can provide information for evaluating the color of the object independent of the shape of the object and the image capturing conditions. In a three-dimensional object, illuminance unevenness according to the surface shape occurs because the distance between the surface of the three-dimensional object and the illumination differs depending on the position. In the present embodiment, the captured image is corrected so as to reduce in illuminance unevenness based on the information around the evaluation area. This reduces the illuminance unevenness according to the surface shape of the three-dimensional object, allowing evaluation of the color of the three-dimensional object more accurately.

Second Embodiment

In the first embodiment, the color of an object surface having a curved shape is evaluated. The texture pattern of the object surface changes in size and is distorted according to the shape of the object and the image capturing conditions. In the present embodiment, the texture (color distribution) of the object surface is evaluated by unifying the sizes of the texture pattern and correcting the distortion by normalizing the captured image. Since the configuration of the image processing system of the present embodiment is the same as that of the first embodiment, a description thereof will be omitted. The processing procedure of the image processing system and the processes of S301 and S302 are also the same as those of the first embodiment, and descriptions thereof will be omitted. The differences between the present embodiment and the first embodiment will be mainly described herein below.

(Processing in S303)

Figure 9:
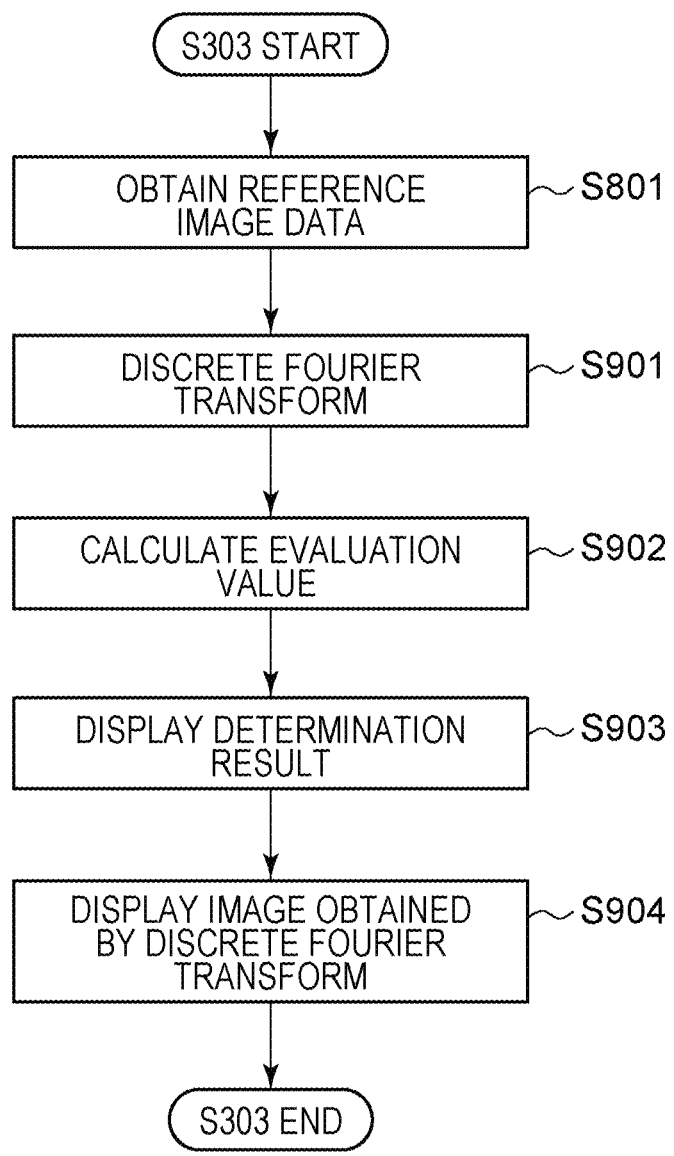
FIG. 9 is a flowchart illustrating processing for color evaluation.

The details of processing executed by the color evaluation application 204 in S303 will be described hereinbelow. FIG. 9 is a flowchart illustrating the procedure of the processing executed by the color evaluation application 204 in S303.

In S801, the reference-image-data acquisition unit 210 obtains reference image data indicating a reference image to be compared with the captured image. The reference image is an image obtained by normalizing image data, by processing in S303, obtained by capturing a marker 102 affixed to an object different from the object 101 or a marker 102 affixed to a different position of the same object 101. In S801, the reference-image-data acquisition unit 210 reads reference image data stored in advance in any area in the HDD 1013.

In S901, the evaluation unit 211 performs discrete Fourier transform on the evaluation areas 403 of the normalized captured image. In S902, the evaluation unit 211 calculates an evaluated value based on the result of discrete Fourier transform in S901. Specifically, the evaluation unit 211 first calculates a spatial frequency (fx, fy) with a maximum amplitude based on the result of discrete Fourier transform, where fx is a frequency in the horizontal direction of the image, and fy is a frequency in the vertical direction of the image. Next, an evaluated value d is calculated using Eq. (2).

[Math. 2]

$$d=|\sqrt{f_x^2+f_y^2}-\sqrt{r_x^2+r_y^2}| \quad \text{Eq. (2)}$$

where (rx, ry) is a reference frequency set in advance.

In S903, the evaluation unit 211 determines whether the texture of the captured image has the same pattern as the pattern of the reference image based on the evaluated value and displays the determination result on the display 105. If the evaluated value d is equal to or less than a predetermined value, a dialog or the like reporting that the texture of the captured image is texture having the same pattern as that of the reference image is displayed on the display 105. If the evaluated value d is greater than the predetermined value, a dialog reporting that the texture of the captured image is texture that has not the same pattern as that of the reference image is displayed on the display 105.

In S904, the evaluation unit 211 displays an image obtained by discrete Fourier transform on the display 105. The image obtained by discrete Fourier transform is an image in which the amplitude values of the pixels calculated by discrete Fourier transform are expressed as 8-bit shade, for example. Displaying the image obtained by discrete Fourier transform allows the user to perform visual examination. Either of S903 and S904 may be performed. For example, in examination of the object 101, in S903, a determination result that the texture is the same may be reported to the user as acceptance and a determination result that the texture is not the same may be reported to the user as non-acceptance.

Effects of Second Embodiment

As described above, the image processing apparatus of the present embodiment evaluates the texture, that is, the distribution of color, of the object surface having a curved shape by unifying the size of the texture pattern and correcting the distortion. This allows accurate evaluation of the color of the three-dimensional object.

Other Embodiments

Figure 10A:
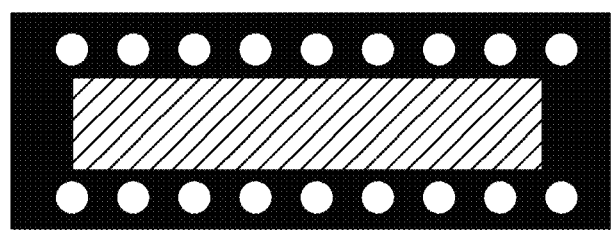
FIG. 10A is a diagram illustrating an example of the marker.
Figure 10B:
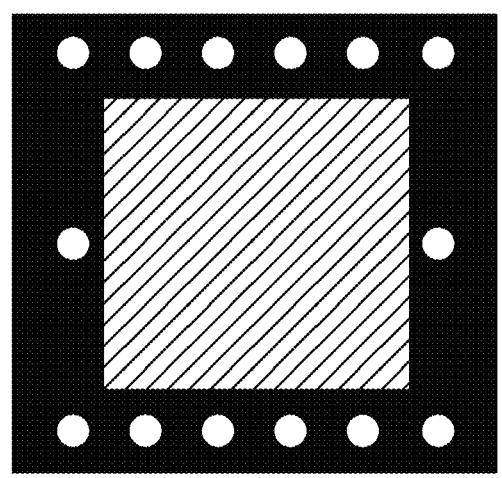
FIG. 10B is a diagram illustrating an example of the marker.
Figure 10C:
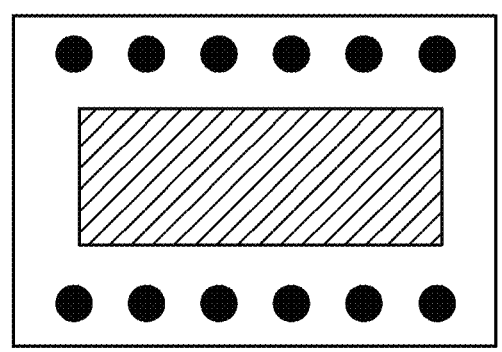
FIG. 10C is a diagram illustrating an example of the marker.

Although the marker 102 in the above embodiments has the layout illustrated in FIG. 4, the layout of the marker is not limited to the above example. FIG. 10 is a diagram illustrating modification examples of the marker 102. As illustrated in FIG. 10A, the marker 102 need not include the ID code area 404 provided that the coordinates of the mark areas 402 can be extracted from the captured image. As illustrated in FIG. 10B, the mark areas 402 in the vertical direction or the horizontal direction may be reduced to increase the evaluation area 403 in size. In this case, the coordinate values and the average pixel values of the omitted mark areas 402 can be calculated by, for example, linear interpolation using the coordinate values and average pixel values of the other mark areas 402. As illustrated in FIG. 10C, the frame area 401 and the mark areas 402 may be reversed in color. This allows the position of the marker 102 to be easily extracted even if the color of the object 101 is similar to the color of the frame area 401. In this case, white information in the processing of reducing illuminance unevenness may be the pixel values of the frame area 401 positioned around each mark area 402, instead of the average pixel value of each mark area 402.

Although the color evaluation application 204 in the above embodiments includes the illuminance-unevenness correction unit 209, the color evaluation application 204 may not include the illuminance-unevenness correction unit 209. In this case, the processing of S302 is terminated without performing the correction in S506 and the processing is shifted to S303. Alternatively, the system may prompt the user to specify either a mode in which illuminance unevenness is corrected or a mode in which it is not corrected and may change the processes according to the specified mode.

Although the shape of the mark areas 402 in the above embodiments is circular, the shape of the mark areas 402 is not limited to the circular shape. For example, the shape of the mark areas 402 may be triangular. In the case where a marker that does not include the ID code area 404 or in a case where distinction from the ID code area 404 can be made based on the size, the shape of the mark areas 402 may be quadrangular.

Although the marker 102 in the above embodiments is affixed to the object 101, the marker 102 may not necessarily be affixed provided that it is disposed so as to perform image capturing according to the shape of the object 101. For example, a marker image projected by a projector may be used as the marker 102.

In the above embodiments, the extraction unit 207 performs edge extraction using the Canny method in S502, but a method for edge extraction is not limited to the above example. For example, edge extraction may be performed using a Sobel filter, for example.

Figure 11B:
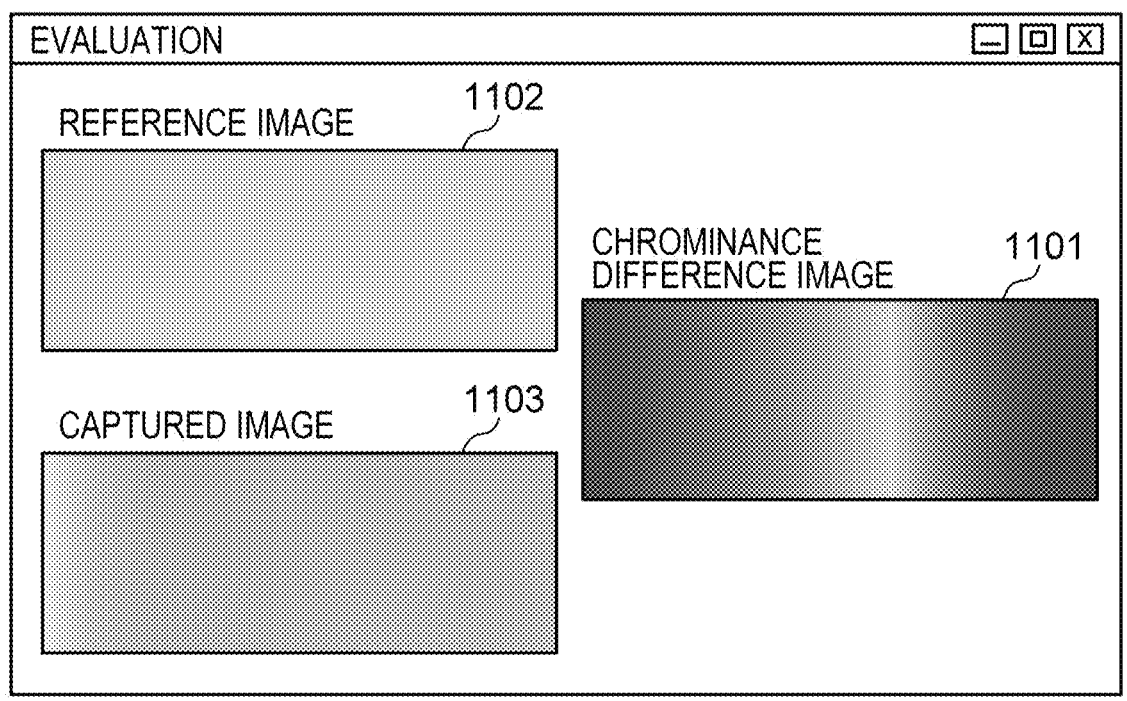
FIG. 11B is a diagram illustrating an example of the image displayed on the display.

In the above embodiments, the evaluation unit 211 displays a color difference image on the display 105 in S804, but the image to be displayed on the display 105 is not limited to the color difference image. For example, as illustrated in FIG. 11B, three images, a normalized captured image, a reference image, and a color difference image, may be displayed on the display 105. In the example of FIG. 11B, an area 1103 corresponding to the evaluation area 403 in the normalized captured image, an area 1102 corresponding to the evaluation area 403 in a reference image, and an area 1101 corresponding to the evaluation area 403 in a color difference image are clipped and displayed.

In the above embodiment, reference image data is used as reference data for color comparison. However, the reference data is not limited to image data and may be any data that indicates color to be compared with the color of the normalized captured image.

In the above embodiments, the image processing system performs image capturing in S301 and performs the processing of S302 on the captured image data obtained by image capturing. However, the processing procedure is not limited to the above example. The processing in S301 may be omitted by performing image capturing similar to the image capturing in S301 in advance and storing captured image data obtained by image capturing in the HDD 1013. Alternatively, the system may prompt the user to specify either a mode for image capturing or a mode of obtaining captured image data obtained by image capturing and may change the processes according to the specified mode.

In the above embodiments, the processing is performed according to the flowcharts of FIG. 3, FIG. 5, FIG. 7, FIG. 8, and FIG. 9. However, the order of the processing is not limited to the processing procedure illustrated in each flowchart. For example, the acquisition of metadata in S503 need not necessarily be performed according to the order of the flowchart in FIG. 5, and may be performed in any order before S505, for example, in parallel to the acquisition of captured image data in S501. The calculation of the average pixel value of each mark area 402 in S504 may be performed in S506.

In the above embodiments, the evaluation of the color of the object 101 is performed by comparing the captured image and the reference image. Alternatively, the color evaluation may be performed without using the reference image. For example, the reference information may not be the image but may be predetermined color signal values. In this case, the reference-image-data acquisition unit 210 obtains reference data indicating the color signal values as a reference-data acquisition unit 210. Alternatively, the system may prompt the user to specify either a mode in which the captured image and the reference image are compared in evaluation of the color of the object 101 or a mode in which the comparison is not performed and may change the processes according to the specified mode.

In the above embodiments, the processing is performed using the marker 102 in which at least four mark areas 402 are disposed on the frame area 401. However, if the image capturing parameters (a focal length and a principal point) of the image capturing unit 103 are obtained, even a marker including three mark areas 402 can be used for color evaluation as described above.

In the above embodiments, the normalization of the captured image is performed using the marker 102 affixed to the object 101. However, a method for normalization of the captured image is not limited to the method using the marker. For example, a method of using measured data obtained using a scanner (measuring device) capable of measuring the shape of the object, or drawing information, such as computer-aided design (CAD) data, as shape data indicating the three-dimensional shape of the object. Specifically, an image of the object captured at a virtual position and orientation is simulated based on shape data obtained by the above method. Processing for determining whether the features of the captured image obtained by actually capturing an image of the object and the image obtained by simulation match is repeated while the position and orientation are being changed. The correspondence relationship between the three-dimensional coordinates of the object and each of the pixels of the captured image is calculated based on the result of simulation of the position and orientation at which the features match. A geometric correction matrix for deforming polygons constituting the object in the shape data to a predetermined shape, such as a rectangle, is calculated based on the calculated correspondence relationship, and the captured image is normalized using the calculated geometric correction matrix.

In the first embodiment, the color of the object 101 is evaluated, and in the second embodiment, the texture (color distribution) of the object 101 is evaluated. Alternatively, both of them may be calculated. Alternatively, the system may prompt the user to specify either a mode for color evaluation or a mode for texture evaluation and may change the processes according to the specified mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention allows providing information for evaluating the color of an object independent of the shape of the object and the image capturing conditions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. An image processing apparatus comprising:
a first acquisition unit configured to obtain image data obtained by capturing an image of an object and a marker affixed to a surface of the object, wherein the marker includes a cut-out area surrounded by a plurality of marks;

a second acquisition unit configured to obtain positional information indicating a known positional relationship among the plurality of marks included in the marker;

an extraction unit configured to extract a positional relationship among the plurality of marks included in the image of the marker as indicated by the image data; and a correction unit configured to correct the image data based on the known positional relationship indicated by the positional information and the extracted positional relationship.

2. The image processing apparatus according to claim 1, wherein the second acquisition unit obtains the positional information indicating the known positional relationship among the plurality of marks included in the marker in a case where the marker is arranged in a plane.

3. The image processing apparatus according to claim 2, wherein the marker includes a plurality of marks for specifying distortion, which occurs due to a shape of the surface of the object, and includes the cut-out area from which the surface of the object is exposed in a case where the marker is arranged on the object.

4. The image processing apparatus according to claim 1, further comprising an evaluation unit configured to evaluate color of the surface of the object based on the corrected image data.

5. The image processing apparatus according to claim 4, further comprising:

a third acquisition unit configured to obtain reference data indicating reference color for evaluating the color of the surface of the object, wherein the evaluation unit evaluates the color of the surface of the object based on color of the image indicated by the corrected image data and the reference color indicated by the reference data.

6. The image processing apparatus according to claim 5, wherein the evaluation unit evaluates the color of the surface of the object based on a color difference between the color of the image indicated by the corrected image data and the reference color indicated by the reference data.

7. The image processing apparatus according to claim 6, wherein the evaluation unit evaluates the color of the surface of the object by determining whether the color difference is equal to or greater than a predetermined threshold.

8. The image processing apparatus according to claim 4, further comprising:

a reduction unit configured to reduce illuminance unevenness generated on the surface of the object in the image, wherein the evaluation unit evaluates the color of the surface of the object based on image data indicating an image in which the illuminance unevenness is reduced.

9. The image processing apparatus according to claim 8, wherein the marker includes a white area; and the reduction unit reduces the illuminance unevenness based on color information on the white area.

10. The image processing apparatus according to claim 9, wherein the plurality of marks are white areas of the marker;

the extraction unit calculates, in the image indicated by the image data, an average pixel value of areas corresponding to the plurality of marks as color information on the white areas; and the reduction unit reduces illuminance unevenness generated on the surface of the object in the image based on the average pixel value.

11. The image processing apparatus according to claim 4, wherein the evaluation unit evaluates distribution of the color of the surface of the object based on a spatial frequency of the image indicated by the corrected image data.

12. The image processing apparatus according to claim 1, wherein the extraction unit calculates central coordinates of each of the plurality of marks included in the marker as information indicating the positional relationship among the marks.

13. The image processing apparatus according to claim 1, wherein the plurality of marks included in the marker are circles having a predetermined area.

14. The image processing apparatus according to claim 1, wherein the marker is a marker including at least four marks.

15. The image processing apparatus according to claim 1, wherein a shape of the surface of the object is curved and shape of the marker conforms to the shape of the surface of the object when affixed to the surface of the object.

16. An image processing method comprising:

obtaining image data obtained by capturing an image of an object and a marker is affixed to a surface of the object, wherein the marker includes a cut-out area surrounded by a plurality of marks;

obtaining positional information indicating a known positional relationship among the plurality of marks included in the marker;

extracting a positional relationship among the plurality of marks included in the image of the marker as indicated by the image data; and correcting the image data based on the known positional relationship indicated by the positional information and the extracted positional relationship.

17. A non-transitory computer-readable storage medium storing a program for causing a computer to perform an image processing method, the image processing method comprising:

obtaining image data obtained by capturing an image of an object and a marker is affixed to a surface of the object, wherein and an image of the marker includes a cut-out area surrounded by a plurality of marks;

obtaining positional information indicating a known positional relationship among the plurality of marks included in the marker;

extracting a positional relationship among the plurality of marks included in the image of the marker as indicated by the image data; and correcting the image data based on the known positional relationship indicated by the positional information and the extracted positional relationship.

* * * * *